Patented Sept. 22, 1953

2,653,149

UNITED STATES PATENT OFFICE 2,653,149

CUPRIFEROUS DISAZO-DYESTUFFS

Henri Riat, Basel, Switzerland, assignor to Ciba Limited, Basel, Switzerland, a Swiss firm No Drawing. Application June 22, 1951, Serial No. 233,107. In Switzerland July 7, 1950

7 Claims. (Cl. 260—146)

According to this invention valuable new cupriferous disazo-dyestuffs are made by treating a disazo-dyestuff of the general formula

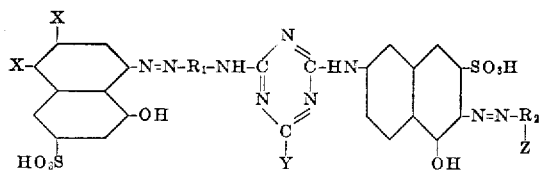

in which:

One X represents a hydrogen atom and the other X a sulfonic acid group, $R_1$ represents a benzene radical in which the —N=N— and —NH— groups are in paraposition relatively to one another, Y represents a hydroxyl group, an —$NH_2$— group or the radical of an amine of the benzene series bound to the triazine ring by the nitrogen atom, $R_2$ represents an aromatic radical of the benzene series, and Z represents a substituent capable of forming ortho:ortho'-dihydroxy-azo-metal complexes with an agent yielding copper in such manner that the copper compound of the ortho:ortho'-dihydroxyazo-dyestuff is formed.

The disazo-dyestuff of the above general formula can be made by coupling a diazotized amine of the benzene series which contains in orthoposition to the diazotizable amino group the aforesaid substituent Z in an alkaline medium with a monoazo-dyestuff of the constitution

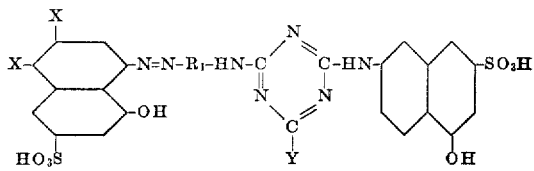

(in which $R_1$, X and Y have the meanings given above).

The substituent Z may be a halogen atom, for example, a chlorine atom, or preferably an alkoxy group, for example, an ethoxy or especially a methoxy group, or a hydroxyl group. In addition to the amino group and the substituent Z the amine advantageously contains further substituents for example, a halogen atom such as a chlorine atom, an alkyl or alkoxy group, such as a methyl or methoxy group. Especially valuable are those amines which contain as a further substituent a sulfonic acid amide group or preferably a sulfonic acid group.

As examples of suitable amines there may be mentioned:

1-amino-2-chlorobenzene-5-sulfonic acid,
1-amino-2-methoxy-5-chlorobenzene,
1-amino-2-methoxybenzene-5-sulfonic acid,
4-chloro-2-amino-1-hydroxybenzene,
2 - amino - 1 - hydroxybenzene - 4 - carboxylic acid anilide,
2 - amino - 1 - hydroxybenzene - 4 - sulfonic acid,
2 - amino - 1 - hydroxybenzene - 4 - sulfonic acid amide.

The monoazo-dyestuffs of the aforesaid constitution containing the cyanuric ring may be made by condensing 1 molecular proportion of cyanuric bromide or advantageously cyanuric chloride with 1 molecular proportion of 2-amino-5-hydroxynaphthalene-7-sulfonic acid, 1 molecular proportion of an aminoazo-dyestuff of the formula

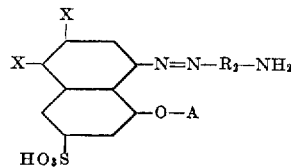

in which:

X and $R_2$ have the meanings given above, and A represents a hydrogen atom or advantageously an —$O_2S$—aryl group, and if desired with 1 molecular proportion of ammonia or an amine of the benzene series, and when A represents an —$O_2S$—aryl group, splitting off this group. Instead of carrying out the last mentioned condensation, the halogen atom still remaining bound to the cyanuric ring may be converted into a hydroxyl group. The two first-mentioned condensations may be carried out in either order of succession. These condensations may be carried out by methods in themselves known for reacting cyanuric halides with amines. Thus, it is desirable to increase the reaction temperature and pH value in stages by conducting the first condensation, for example, at 0° C. and in a strong acid medium, the second at about 30° C. in a somewhat weaker acid medium, and the third, if any, at about 80° C. and a pH value produced by the presence of a considerable excess of the base used in the reaction, for example, aminobenzene.

The amino-monoazo-dyestuffs of the last mentioned formula can also be made by methods in themselves known by coupling a diazo compound of an 8-aryl-sulfonyl-hydroxy-1-aminonaphthalene-3:6- or -4:6-disulfonic acid (advantageously the para-toluene sulfonic acid ester of the aminohydroxynaphthalene disulfonic acid) with an amine of the formula H—$R_2$—$NH_2$, such, for example, as 1-amino-2-ethoxy-5-methylbenzene, and especially 1-amino-2:5-dimethylbenezene and preferably 1-amino-2-methoxy-5-methylbenzene, and then if desired, hydrolyzing the aryl sulfonic ester group to a hydroxyl group.

The hydrolysis of the aryl sulfonic ester group (—O—A), which may be carried out as stated above advantageously after the condensation of the aminoazo-dyestuff and the 2-amino-5-hydroxynaphthalene-7-sulfonic acid with the cyanuric halide, is brought about, for example, with heat in a dilute solution of an alkali hydroxide.

The coupling of the diazotized amine of the benzene series with the monoazo-dyestuff, which contains the cyanuric radical, is carried out in an alkaline medium, for example, a medium rendered alkaline with an alkali carbonate or an alkaline earth metal hydroxide.

The treatment with an agent yielding copper is carried out in the present process in such manner that the complex copper compound of the ortho : ortho' - dihydroxyazo - dyestuff is formed. As agents yielding copper there are used advantageously the copper tetramine compounds obtainable from copper salts, for example, copper sulfate, and ammonia or organic bases such as pyridine, morpholine or ethanolamines. The reaction with the agent yielding copper is advantageously carried out at a raised temperature, for example, at about 80–90° C. When the substituent Z in the starting material is not already a hydroxyl group, but is an alkoxy group or even a halogen atom, it is of advantage to prolong the period of treatment with the agent yielding copper to several hours in order to achieve a practically complete conversion into the copper complex of the ortho:ortho'-dihydroxyazo dyestuff.

The cupriferous disazo-dyestuffs of the present invention are new and correspond to the general formula

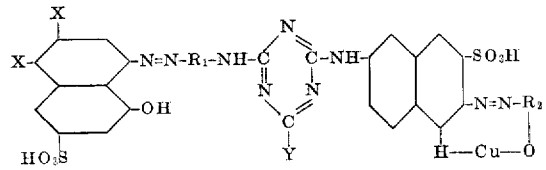

in which:

One X represents a hydrogen atom and the other X a sulfonic acid group, $R_1$ represents a benzene radical in which the groups —N=N— and —NH— are in para-position relative to one another, Y represents a hydroxyl group, an —NH₂— group or the radical of an amine of the benzene series bound by the nitrogen atom to the triazine ring, And $R_2$ represents an aromatic radical of the benzene series in which the groups —N=N— and —O—Cu—O are in ortho-position relatively to one another.

The above formula doubtlessly indicates the correct stoichiometric quantities and the correct place of attachment of the copper atom; the distribution of the main and secondary valences in the complex linkage of the copper to the dyestuff, on the other hand, is not yet established.

The cupriferous disazo-dyestuffs can be used for dyeing or printing a very wide variety of materials such as wool, silk and especially cellulose fibers such as cotton, linen and artificial silk and staple fibers of regenerated cellulose. There are obtained Bordeaux tints of good fastness to light and the latter property persists after an ordinary anti-creasing treatment, for example, with a urea-formaldehyde resin.

The following examples illustrate the invention, the parts and percentages being by weight:

Example 1

A solution of the sodium salt of 23.9 parts of 2-amino-5-hydroxynaphthalene-7-sulfonic acid weakly acid to litmus is run in the course of 30 minutes into a fine suspension of 18.4 parts of cyanuric chloride in 300 parts of water. The whole is stirred at 10° C. and a solution of 5.3 parts of anhydrous sodium carbonate in 50 parts of water is introduced dropwise in the course of 2–3 hours, during which the weakly acid reaction to Congo of the mixture should never be allowed to disappear. The whole is subsequently stirred for a further hour at 10–15° C., and a weakly alkaline solution of 62 parts of the monoazo-dyestuff from the diazotized toluene sulfonic acid ester of 1-amino-8-hydroxynaphthalene - 3:5 - disulfonic acid and 1-amino-2-methoxy-5-methylbenzene is run into the primary condensation product in the course of 20 minutes, the temperature being permitted to rise to 25–30° C. A solution of 4 parts of anhydrous sodium carbonate in 50 parts of water is added dropwise in the course of several hours and at a rate such that the pH value of the reaction mixture does not exceed 6.0. The whole is further stirred overnight at 20–30° C. 20 parts of aminobenzene are then added, and the whole is heated for 3 hours at 90–95° C..

In order to split off the toluene sulfonic acid radical the solution of the condensation product is mixed with a quantity of sodium hydroxide solution of 30 per cent strength such that the reaction mixture has a content of sodium hydroxide of 2 per cent, and the mixture is then heated up to 80–85° C. and maintained at that temperature for one hour. The solution is then mixed with hydrochloric acid of 30 per cent strength to produce a weakly alkaline reaction to Brilliant Yellow, and the finished condensation product is salted out and separated by filtration.

20.3 parts of 1-amino-2-methoxybenzene-5-sulfonic acid are diazotized, and the diazo compound is coupled in a solution rendered alkaline with sodium carbonate with 87.4 parts of the condensation product obtained as described above.

The disazo-dyestuff obtained in the manner described above is salted out, separated by filtration and dissolved in 2000 parts of warm water. The solution is mixed with 60 parts of ammonia solution of 25 per cent strength and 27 parts of crystalline copper sulfate dissolved in 100 parts of water, and the whole is heated for 5 hours at 80–90° C. The copper complex of the formula

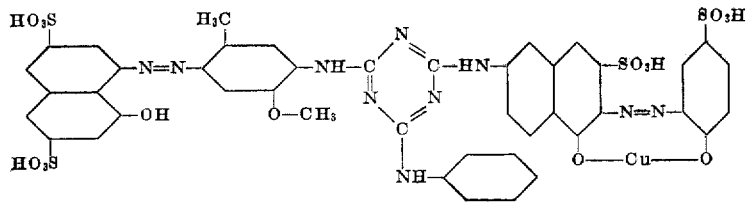

is then salted out, separated by filtration and dried. It is a dark colored powder which dissolves in water with a bluish red coloration and dyes cotton pure Bordeaux red tints which are fast to light.

By using ammonia, instead of aminobenzene, and proceeding otherwise in the manner described above, there is obtained a dyestuff which dyes cotton somewhat more yellowish tints.

*Example 2*

87.4 parts of the ternary condensation product obtained by the method described in Example 1 by condensing 1 mol of cyanuric chloride with 1 mol of 2-amino-5-hydroxynaphthalene-7-sulfonic acid, 1 mol of the monoazo-dyestuff from the diazotized toluene sulfonic acid ester of 1-amino-8-hydroxynaphthalene-3:6-disulfonic acid and 1-amino-2-methoxy-5-methylbenzene, 1 mol of aminobenzene and then splitting off the toluene sulfonic acid radical, are dissolved in the form of sodium salt in 800 parts of warm water, and then mixed with 100 parts of a calcium hydroxide suspension of 25 per cent strength and cooled to 10° C.

18.9 parts of 2-amino-1-hydroxybenzene-4-sulfonic acid are diazotized in the usual manner. The diazo compound is neutralized with sodium bicarbonate and introduced at 10° C. into the mixture obtained as described in the previous paragraph.

After stirring for several hours the whole is heated to 50° C., 40 parts of anhydrous sodium carbonate are added, precipitated calcium carbonate is separated by filtration, and the solution of the dyestuff is heated with a solution of 25 parts of crystalline copper sulfate dissolved in 100 parts of water and 60 parts of ammonia solution of 25 per cent strength for one hour at 80° C. The copper complex is worked up in the usual manner; it corresponds to the same formula and has the same properties as the dyestuff of Example 1.

By using 2-amino-1-hydroxybenzene-4-carboxylic acid anilide instead of 2-amino-1-hydroxybenzene-4-sulfonic acid, a similar dyestuff is obtained. By using 2-amino-1-hydroxy-4-chlorobenzene a dyestuff is obtained which corresponds to the formula condensation product mentioned, the product obtained by condensing 1 mol of cyanuric chloride with 1 mol of 2-amino-5-hydroxynaphthalene-7-sulfonic acid and 1 mol of the monoazo-dyestuff from the diazotized toluene sulfonic acid ester of 1-amino-8-hydroxynaphthalene-3:6-disulfonic acid and 1-amino-2-methoxy-5-methylbenzene, and then splitting off the toluene sulfonic acid radical by heating with a dilute solution of sodium hydroxide, whereby the third chlorine atom of the cyanuric radical is exchanged for a hydroxyl group, a dyestuff is obtained which corresponds to the formula

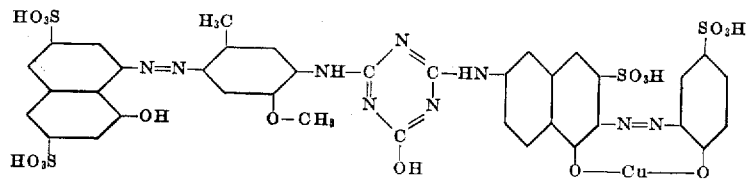

and which dyes cotton tints having a somewhat more yellowish shade.

*Example 3*

20.3 parts of 1-amino-2-methoxybenzene-5-sulfonic acid are diazotized in the usual manner, and the diazo compound is coupled in a solution rendered alkaline with sodium carbonate with 87.4 parts of the condensation product obtained by the method described in Example 1 from 1 mol of cyanuric chloride, 1 mol of the monoazo-dyestuff from the diazotized toluene sulfonic acid ester of 1-amino-8-hydroxynaphthalene-4:6-disulfonic acid and 1-amino-2-methoxy-5-methylbenzene, and 1 mol of aminobenzene, and then splitting off the toluene sulfonic acid radical. In order to convert the dyestuff into its complex copper compound, the coupling solution is heated with a solution of 27.5 parts of crystalline copper sulfate and 60 parts of ammonia solution of 25 per cent strength in 100 parts of water for 4 hours at 80° C. The dyestuff is then worked up in the usual manner. After drying, there is obtained a dark powder, which dissolves in water with a bluish red coloration and dyes cotton Bordeaux red tints of very good fastness to light.

*Example 4*

The diazo compound from 20.3 parts of 2-amino-1-methoxybenzene-4-sulfonic acid is coupled in a solution rendered alkaline with sodium carbonate with 85.7 parts of the condensation product obtained by the method described in Example 1 by condensing 1 mol of cyanuric chloride with 1 mol of 2-amino-5-hydroxynaphthalene-7-

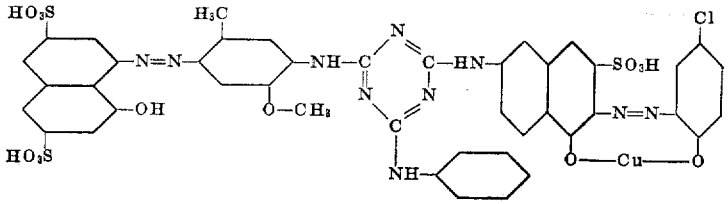

and dyes cotton tints having a somewhat more violet shade.

By using in the preparation of the dyestuff first described in this example, instead of the ternary sulfonic acid, 1 mol of the monoazo-dyestuff from the diazotized toluene sulfonic acid ester of 1-amino - 8 - hydroxynaphthalene-3:6 - disulfonic acid and 1-amino-2:5-dimethylbenzene, and 1 mol of aminobenzene, and then splitting off the toluene sulfonic acid radical. The dyestuff solution is mixed with 27.5 parts of crystalline copper sulfate dissolved in 100 parts of water and 60 parts of ammonia solution of 25 per cent strength, and the whole is heated for 4 hours at 80° C. The copper complex of the formula

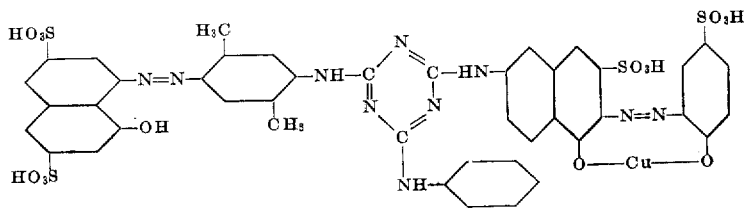

isolated in the usual manner is obtained, after drying, in the form of a dark powder which dissolves in water with a red coloration and dyes cotton red tints.

*Example 5*

100 parts of cotton are entered at 40° C. into a dyebath containing in 3000 parts of water, 1 part of the dyestuff obtained as described in Example 1. Dyeing is carried on for ½ hour while raising the temperature to 90° C., 40 parts of crystalline sodium sulfate are added and dyeing is continued for a further ½ hour at 90–95° C. The cotton is then rinsed and finished in the usual manner. It is dyed a Bordeaux tint which is fast to light.

What is claimed is:
1. A cupriferous disazo dyestuff of the formula

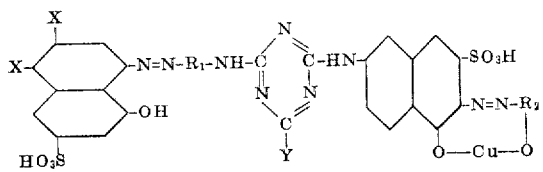

in which one X represents a hydrogen atom and the other X a sulfonic acid group, $R_1$ represents a benzene radical in which the groups —N=N— and —NH— are in para-position relatively to one another, Y represents a member of the group consisting of a hydroxyl group, an —NH$_2$— group and an aminobenzene radical bound by its nitrogen atom to the triazine ring, and $R_2$ represents a benzene radical in which the groups —N=N— and —O—Cu—O— are in ortho-position relatively to one another.

2. A cupriferous disazo dyestuff of the formula

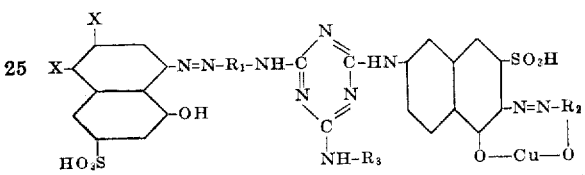

in which one X represents a hydrogen atom and the other X a sulfonic acid group, $R_1$ represents a benzene radical in which the groups —N=N— and —NH— are in para-position relatively to one another, $R_3$ represents a benzene radical, and $R_2$ represents a benzene radical in which the groups —N=N— and —O—Cu—O— are in ortho-position relatively to one another.

3. A cupriferous disazo dyestuff of the formula

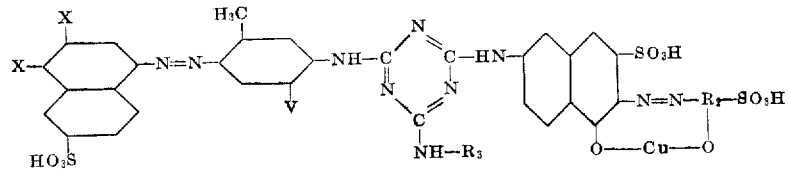

in which one X represents a hydrogen atom and the other X a sulfonic acid group, V stands for a member of the group consisting of the radicals —CH$_3$ and —O—CH$_3$, $R_3$ represents a benzene radical and $R_2$ represents a benzene radical in which the groups —N=N— and —O—Cu—O— are in ortho-position relatively to one another.

4. The cupriferous disazo dyestuff of the formula:

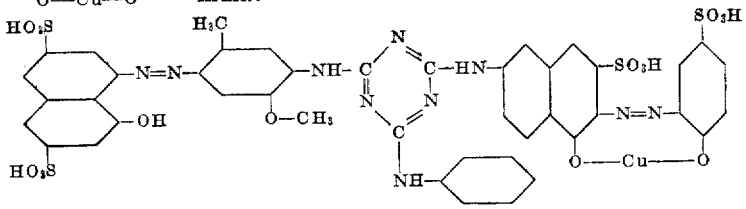

5. The cupriferous disazo dyestuff of the formula

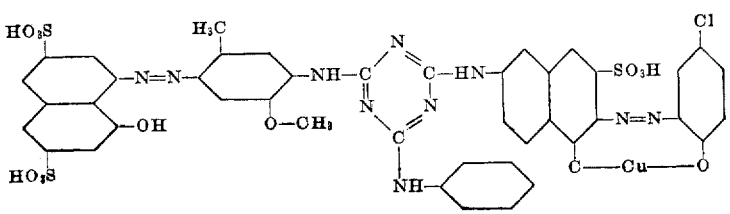

6. The cupriferous disazo dyestuff of the formula
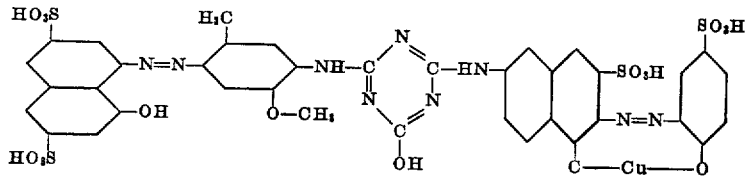
7. The cupriferous disazo dyestuff of the formula
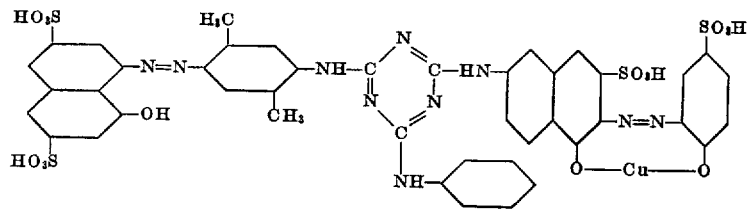
HENRI RIAT.
References Cited in the file of this patent
UNITED STATES PATENTS
| Number | Name | Date |
|---|---|---|
| 1,667,312 | Fritzche et al. | Apr. 24, 1928 |
| 1,779,298 | Straub et al. | Oct. 21, 1930 |

Certificate of Correction

Patent No. 2,653,149 September 22, 1953

HENRI RIAT

It is hereby certified that error appears in the printed specification of the above numbered patent requiring correction as follows:

Column 1, line 29, for "disazo-dyestuff" read *disazo-dyestuffs*; column 2, line 59, for "-dimethylbenezene" read *-dimethylbenzene*; column 3, line 21, for "tetramine" read *tetrammine*; line 45, right-hand portion of the formula, for "H-Cu-O" read *O-Cu-O*; columns 7 and 8, lower right-hand portion of the formula, claim 5, for "C-Cu-O" read *O-Cu-O*; columns 9 and 10, lower right-hand portion of the formula, claim 6, for "C-Cu-O" read *O-Cu-O*;

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*